US012114805B2

(12) United States Patent
Yu

(10) Patent No.: US 12,114,805 B2
(45) Date of Patent: Oct. 15, 2024

(54) COMPOSITE MATERIAL APPLIED TO COOKWARE, METHOD FOR PREPARING THE SAME, AND COOKWARE THEREOF

(71) Applicant: NINGBO XINGTAO NEW MATERIAL TECHNOLOGY CO., LTD., Zhejiang (CN)

(72) Inventor: Xuming Yu, Zhejiang (CN)

(73) Assignee: NINGBO XINGTAO NEW MATERIAL TECHNOLOGY CO., LTD., Zhejiang (CN)

( * ) Notice: Subject to any disclaimer, the term of this patent is extended or adjusted under 35 U.S.C. 154(b) by 98 days.

(21) Appl. No.: 17/970,784

(22) Filed: Oct. 21, 2022

(65) Prior Publication Data

US 2024/0074610 A1 Mar. 7, 2024

Related U.S. Application Data

(63) Continuation of application No. PCT/CN2022/120622, filed on Sep. 22, 2022.

(30) Foreign Application Priority Data

Sep. 1, 2022 (CN) .......................... 202211067862.7
Sep. 15, 2022 (CN) .......................... 202211120735.9

(51) Int. Cl.
  *A47J 36/02* (2006.01)
  *C23C 4/11* (2016.01)

(52) U.S. Cl.
  CPC .................. *A47J 36/02* (2013.01); *C23C 4/11* (2016.01)

(58) Field of Classification Search
  CPC .................................. A47J 36/05; C23C 4/11
  (Continued)

(56) References Cited

U.S. PATENT DOCUMENTS

2011/0308989 A1* 12/2011 Berrux .................. A47J 27/002
                                                        427/327
2017/0334170 A1* 11/2017 Haghdoost .............. B32B 15/04
  (Continued)

FOREIGN PATENT DOCUMENTS

CN      215226718 U     12/2021
CN      113999555 A      2/2022
  (Continued)

*Primary Examiner* — J. Gregory Pickett
*Assistant Examiner* — Niki M Eloshway
(74) *Attorney, Agent, or Firm* — Scully, Scott, Murphy & Presser, P.C.

(57) ABSTRACT

The present disclosure discloses a composite material applied to cookware, a method for preparing the same, and a cookware thereof. The composite material includes hard granular material, silicon-containing cladding material and metallic cladding material: wherein the hard granular material is clad in the silicon-containing cladding material; the silicon-containing cladding material is clad in the metallic cladding material, and the silicon-containing cladding material includes main compositions one or more selected from the group consisting of silane, siloxane, silane polymer, and siloxane polymer. There is no toxic gas prepared after the composite material is decomposed at a high temperature. The cookware with a protective layer applied with the composite material has high wear resistance, corrosion resistance, and durable cleanability, as well as safety and non-toxicity.

12 Claims, 1 Drawing Sheet

(58) Field of Classification Search
USPC .................................................. 220/573.1
See application file for complete search history.

(56) References Cited

U.S. PATENT DOCUMENTS

| | | | |
|---|---|---|---|
| 2018/0086919 A1* | 3/2018 | Gantillon | C09D 179/08 |
| 2019/0186035 A1* | 6/2019 | Haghdoost | C09D 5/084 |
| 2020/0361824 A1* | 11/2020 | Helskens | C09D 1/00 |

FOREIGN PATENT DOCUMENTS

| | | |
|---|---|---|
| CN | 114226722 A | 3/2022 |
| CN | 114574011 A | 6/2022 |

\* cited by examiner

COMPOSITE MATERIAL APPLIED TO COOKWARE, METHOD FOR PREPARING THE SAME, AND COOKWARE THEREOF

CROSS REFERENCE TO RELATED APPLICATION

This application claims the benefit under 35 U.S.C. § 119 to Chinese Patent Application No. PCT/CN2022/120622, filed on Sep. 22, 2022 in the China National Intellectual Property Administration (CNIPA), the disclosure of which is incorporated by reference herein in its entirety

TECHNICAL FIELD

The present disclosure relates to the field of cooking equipment, and more specifically composite material applied to cookware, methods for preparing the same, and cookware thereof.

BACKGROUND

With the continuous improvement of living standards, people have raised higher requirements for the performance and quality of cooking utensils. Cooking utensils with good quality should be heated evenly, cleaned easily, with excellent corrosion resistant and wear resistant. There are more than 100 million food cooking utensils demanded with high performance in China every year. At present, functional coating is generally applied on the utensil's inner cooking surface, achieving related functions by using the surface effect of the functional coating in order to make food cooking utensils easy to clean and corrosion resistant in cooking process. The effectiveness of cleanability and corrosion resistance will disappear with the failure of the coating.

At present, the most versatile coating is organic resin-based coating, which features low surface hardness and strength, with poor resistance to the scratch of metal kitchen tools, as well as poor persistence at high temperature and humidity. The surface is easy to be scratched and marred, leading to failure of cleanability and other properties. In addition, fluorine resin and other organic resin coating material can decompose and volatilize toxic and harmful gases at high temperature, which poses threat to the user's health.

Therefore, there is a need to provide cookware which has wear resistance, corrosion resistance and durable cleanability, as well as non-toxicity, healthfulness and safety, overcoming the shortcomings of existing functional coating cookware, and meeting the consumers' needs to cooking utensils.

SUMMARY

The present disclosure aims to solve one of the technical problems in the related technology at least to a certain extent. For this purpose, the present disclosure aims to provide composite material applied to cookware, methods for preparing the same, and cookware thereof. The cookware features excellent wear resistance, corrosion resistance and durable cleanability, as well as safety and non-toxicity.

According to one aspect of the present disclosure, a composite material applied to cookware is provided. The composite material includes hard granular material, silicon-containing cladding material and metallic cladding material, wherein the hard granular material is clad in the silicon-containing cladding material, while the silicon-containing cladding material is clad in the metallic cladding material. The silicon-containing cladding material includes main composition consisting of at least one selected from the group consisting of silane, siloxane, silane polymer, and siloxane polymer. The composite material applied to cookware in the present disclosure, with multi-layer sandwich structure with hard-soft-hard base, has an inner hardcore of the hard granular material, with relatively high hardness and wear resistance. The protective layer applied to cookware, which is prepared from the composite material, has a granular supportive frame formed by the hard granular material, which gives the protective layer excellent hardness, structural strength and wear resistance. The hard granular material is clad in the silicon-containing composite material with low surface energy, which forms functional layer with soft base, which gives the protective layer excellent cleanability. The silicon-containing cladding material includes mainly silane, siloxane, silane polymer, and siloxane polymer, which will not produce toxic or dangerous gases after thermal decomposition, while decomposition product has hard structure with low surface energy, enabling the protective layer to maintain wear resistance and cleanability durably. The metallic cladding material, as an outer hard cladding layer, is arranged outside the silicon-containing cladding material. On the one hand, an outer protective layer is formed to prevent the silicon-containing cladding material from being broken or damaged in the process of material transportation, loading and storage, or directly being decomposed in thermal process such as thermal spraying or thermal cladding, affecting the product performance. On the other hand, when the protective layer is prepared with thermal processes such as thermal spraying or thermal cladding, the metallic cladding material is heated to melt and bonded to the surface of the cookware tightly. At the same time, binding phase is formed in the protective layer, which combines individual hard granules clad in the silicon-containing cladding material into a whole, ensuring the protective layer and the cookware bind together and improving the overall strength and durability of the protective layer.

For example, the siloxane polymer is one or more selected from the group consisting of methyl silicone oil and dimethicone, and the silane is one or more selected from the group consisting of tetraethoxy silane and methyltriethoxysilane. The foregoing siloxane polymer material and silane material have low surface energy and good hydrophobicity, providing the cookware excellent cleanability. At the same time, the foregoing material contains chemical elements of Si, H, C, and O only, which will not produce toxic gases after decomposition, and is safe to use. After decomposition, the foregoing material will decompose to composites with structures of low surface energy and high hardness, such as SI—C, SI—O, and C, etc, ensuring the protective layer with durable strength, wear resistance, and cleanability.

For example, the mass proportion of the main compositions in the silicon-containing cladding material is 20-80%. The foregoing composition ratio of the silicone-containing cladding material ensures that there are sufficient amounts of silane, siloxane, silane polymer, and siloxane polymer, and these low surface energy materials are attached to and clad around the surface of hard granular material. The cookware prepared with the composite material has durable wear resistance, corrosion resistance and good cleanability.

For example, the mass ratio of the hard granular material and the silicon-containing cladding material is 1:1-1:3. The ratio of hard granular material and silicon-containing cladding material affects the performance of the protective layer prepared with the composite material. If the proportion of silicon-containing cladding material is too small, the hard granular material cannot be fully clad, which will lead to negative effect on the final protective layer's wear resistance, corrosion resistance and cleanability. If the proportion of silicon-containing cladding material is too large, the excess of the cladding material will detach from the hard granular material in the following technological process as the cladding material cannot fully contact the surface of hard granular material. The excess of the silicon-containing cladding material will also have negative effect on the following process of the composite material such as drying and granulating, as well as on the protective layer's strength and wear resistance due to the improperly small proportion of the hard granular material. In the present application, the ratio of hard granular material and silicon-containing cladding material is 1:1 to 1:3, which ensures the hard granular material is clad in the silicon-containing cladding material sufficiently and evenly. The sufficiency of hard granular material provides the protective layer with hardness and strength, which ensures the protective layer's excellent wear resistance, hardness, strength, and cleanability.

For example, the hard granular material is one or more selected from the group consisting of metallic material, ceramic material, carbon particle, and silicon metal. The foregoing hard granular material has excellent hardness, resistance and corrosion resistance. Hence, the protective layer prepared from the composite material has excellent hardness, wear resistance and corrosion resistance, performing functions durably.

For example, the metallic material is one or more selected from the group consisting of titanium, nickel, chromium, silver, copper, iron, molybdenum, titanium alloy, aluminum alloy, stainless steel, Ni—Cr alloy, Ni—Cu alloy, co-CR—W alloy, Ni—CR—Al—Y alloy, co-CR—Al—Y alloy, and Fe—CR—Al—Y alloy; the ceramic material is one or more selected from silicon carbide, silicon oxide, hexagonal boron nitride, yttrium oxide, zirconium oxide, and titanium oxide; the carbon granular is one or more selected from graphite particle, graphene particle and carbon fiber particles. The hard granular material has excellent hardness, wear resistance and corrosion resistance, as well as non-toxicity. Hence, the protective layer made of the composite material has excellent hardness, wear resistance and corrosion resistance, performing functions with safety and non-toxicity durably.

For example, the particle size of the hard granular material is 300-600 mesh. The application of hard granular material in the foregoing particle size range ensures the silicon-containing cladding material and hard granular material to be mixed together uniformly, enables the silicon-containing cladding material to adhere to the surface of the hard granule uniformly, and is conducive to the following process of granulation. At the same time, the application of such particle size range of hard granule material ensures the hard granule material to disperse in the protective layer evenly, and reduces the porosity of the protective layer, which gives the protective layer excellent wear resistance and durable cleanability.

For example, the composite material is powder cored wire or composite powder, wherein the powder cored wire has powder core of hard granular material clad in the silicon-containing cladding material, and outer shell of the metallic cladding material. The composite powder has core-shell structure, which has core of hard granular material clad in silicon-containing cladding material, then clad in metallic cladding material. The composite material in the present application can be made into the form of powder cored wire or composite powder, suitable for different processing technologies. The powder cored wire has strong applicability due to short preparation period and low production cost, while the composite powder has uniform granular performance due to the evenly cladding of outer metal.

According to another aspect of the disclosure, a preparation method of composite material applied to cookware is provided. The method includes the following steps: mixing the hard granular material evenly with the silicon-containing cladding material till the hard granular material clad in the silicon-containing cladding material uniformly; obtaining composite granule clad in the silicon-containing cladding material on the surface from a mixture of the hard granular material and the silicon-containing cladding material via a process of spraying-granulating or drying-grinding; dual cladding the composite granule clad in the silicon-containing cladding material on the surface in the metallic cladding material, obtaining the composite material applied to cookware. The composite material prepared with the foregoing method ensures the hard granule is clad in the silicon-containing cladding material fully and uniformly, and the composite granule is clad again in the metallic cladding material fully, which will improve the performance of the composite material.

For example, the dual cladding method is selected from the powder-in-tube cladding, powder-in-shell cladding, vacuum plating and chemical plating. Options for dual cladding method for the preparation of powder cored wire are the powder-in-tube cladding and the powder-in-shell cladding, wherein the metallic cladding material is shaped to a metal tube/a thin metal strip, and the composite granule clad in the silicon-containing cladding material is filled into the outer shell of the metal tube/thin metal strip, obtaining the composite powder core wire in a specific size via continuous processes of rolling and stretching for reducing diameters. The foregoing method has strong applicability due to short preparation period and low production cost. Options for dual cladding processes for the preparation of composite powder are the vacuum plating and the chemical plating, wherein the surface of composite granule clad in silicon-containing cladding material is plated with metallic cladding material evenly, obtaining the granule with uniform performance.

A further aspect of the present disclosure is provided cookware, which includes substrate and a protective layer, wherein the substrate includes an inner cooking surface, and the protective layer is arranged at least on the inner cooking surface of the substrate, and the protective layer is prepared from the composite material in the present application. The cookware, with a protective layer with an inner cooking surface, has excellent wear resistance, corrosion resistance, and durable cleanability.

For example, the protective layer is formed by the process of thermal spraying or thermal cladding by processing the composite material on the inner cooking surface of the substrate. The metallic cladding material, as the outer layer of the said composite material, is heated to melt during the preparation of the protective layer, and bonds to the surface of the cookware firmly, while the hard granule clad in silicon-containing cladding material is bonded together firmly, which gives the prepared protective layer excellent strength, wear resistance, and durable cleanability, as well as not easy to be peeled off.

For example, the protective layer is also permeated and modified with low surface energy material. Some pores will distribute on the surface of the protective layer due to the actual operation deviation and thermal decomposition of silicon-containing cladding material when the protective layer is prepared via thermal processes such as thermal spraying or thermal cladding. The surface free energy of the protective layer will be reduced further when the protective layer is permeated and modified with low surface energy material after being prepared via thermal process and the cleanability of cookware will be improved. Options for the low surface energy material are fatty acid, silicone oil, and titanium silicon oxide, etc.

The additional aspects and advantages of the present disclosure will be set forth in part in the following description and in part will become apparent from the following description or become known through the practice of the present disclosure.

REFERENCE NUMERALS

Figure 1:
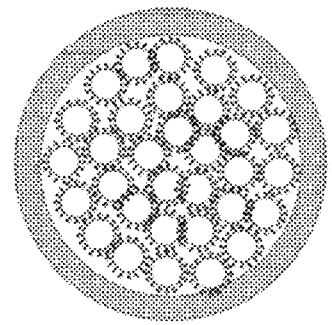
FIG. 1 illustrates a structural diagram of the composite material in Embodiment 1 of the present disclosure.

1—The hard granule clad in silicon-containing cladding material; 2—metal binding phase.

DETAILED DESCRIPTION

Embodiments of the present disclosure will be described in detail hereinafter, and exemplary embodiments will be shown in accompanying drawings, wherein identical or like reference numerals designate identical or like elements or elements having the same or like functions throughout the specification. The embodiments described hereinafter with reference to the accompanying drawings are exemplary and are intended to explain the disclosure and are not to be construed as limitations of the present disclosure.

A composite material applied to cookware is provided. The composite material includes hard granular material, silicon-containing cladding material and metallic cladding material, wherein the hard granular material is clad in the silicon-containing cladding material, while the silicon-containing cladding material clad in the metallic cladding material. The silicon-containing cladding material includes a main composition one or more selected from the group consisting of silane, siloxane, silane polymer, and siloxane polymer. Different from the commonly used functional cladding material with an organic resin base, the mentioned composite material applied to cookware, with a multi-layer sandwich structure with a hard-soft-hard base, has an inner hardcore of the hard granular material, which gives the composite material relatively high hardness and wear resistance. The protective layer which is prepared from the mentioned composite material has a granular supportive frame formed by the hard granular material, which improves the protective layer's hardness, structural strength and wear resistance significantly. The hard granular material is clad in the silicon-containing cladding material with low surface energy, which forms a functional layer with a soft base, giving the protective layer an excellent cleanability. The silicon-containing cladding material includes mainly silane, siloxane, silane polymer, and siloxane polymer, which will not produce toxic or dangerous gases after thermal decomposition, while the decomposition products have hard structures with low surface energy, such as SI—C, SI—O, and C, ensuring the protective layer to keep excellent cleanability and wear resistance after decomposition. The metallic cladding material, as an outer hard cladding layer, is arranged outside the silicon-containing cladding material. On the one hand, an outer protective layer is formed to prevent the silicon-containing cladding material from being broken or damaged in the process of material transportation, loading and storage, or directly being decomposed in thermal process such as thermal spraying or thermal cladding, affecting the product performance. On the other hand, when the protect layer is prepared with thermal processes such as thermal spraying or thermal cladding, the metallic cladding material is heated to melt and bonded to the surface of the cookware tightly. At the same time binding phase is formed in the protective layer, which connects individual hard granules clad in the silicon-containing cladding material into a whole, ensuring the protective layer and the cookware to bind together and improving the overall strength and durability of the protective layer.

Specifically, the siloxane polymer is one or more selected from the group consisting of methyl silicone oil and dimethicone, and the silane is one or more selected from the group composite of tetraethoxy silane and methyltriethoxysilane. The foregoing siloxane polymer material and silane material have low surface energy and good hydrophobicity, providing the protective layer excellent cleanability. At the same time, the foregoing material contains chemical elements of Si, H, C, and O only, which will not produce toxic gases, and is safe to use. After decomposition, the foregoing material will decompose to composites with structures with low surface energy and high hardness, such as SI—C, SI—O, and C, etc, ensuring the protective layer durable strength, wear resistance and cleanability.

The mass proportion of the main compositions in the silicon-containing cladding material is 20-80%. The proportion of silane, siloxane, silane polymer, and siloxane polymer, which are the main functional compositions of silicon-containing cladding material, has an effect on the final protective layer's wear resistance, strength and cleanability. The excessive lowness of the proportion of main compositions leads to relative lowness of the proportion of functional compositions, resulting in the protective layer poor cleanability. The foregoing composition ratio of the silicone-containing cladding material ensures that there are sufficient amounts of silane, siloxane, silane polymer, and siloxane polymer and these low surface energy materials are attached to and clad around the surface of hard granular material. The cookware prepared with the composite material has durable wear resistance, corrosion resistance and good cleanability.

In addition to the main compositions, silicon-containing cladding material can also contain auxiliary compositions, such as conventional solvents, auxiliaries (dispersive auxiliaries, mobile auxiliaries, etc.), fillings, etc., further improving the property of compositions. The main compositions in silicon-containing cladding material refer to the compositions that play a major functional role in improving cleanability, wear resistance and corrosion resistance, rather than the auxiliary compositions such as fillings, auxiliaries and solvents that might be contained play an auxiliary function, even if with a large amount.

Specifically, the mass proportion of main compositions in the silicon-containing cladding material is 20-80%. For example, the mass proportion of the main compositions in the silicon-containing cladding material is 20-70%, 20-60%, 20-50%, 20-40%, 20-30%, 30-70%, 30-60%, 30-50%, 30-40%, and 40-50%, etc. For example, the mass proportion of main compositions in silicon-containing cladding material is 20%, 25%, 30%, 35%, 40%, 45%, 50%, 55%, 60%, 65%, 70%, 75%, and 80%, etc.

The mass ratio of the hard granular material and the silicon-containing cladding material is 1:1-1:3. The ratio of hard granular material and silicon-containing cladding material has an effect on the performance of the protective layer prepared with the composite material. If the proportion of silicon-containing cladding material is too small, the hard granular material cannot be fully clad, which will lead to negative effect on the final protective layer's wear resistance, corrosion resistance and cleanability. If the proportion of silicon-containing cladding material is too large, the excess of the cladding material will detach from the hard granular material in the following technological process as the cladding material cannot fully contact the surface of hard granular material. The excess of the silicon-containing cladding material will also have negative effect on the following process of the composite material such as drying and granulating, as well as on the protective layer's strength and wear resistance due to the improperly small proportion of the hard granular material. The ratio of hard granular material and silicon-containing cladding material ensures the hard granular material is clad in the silicon-containing cladding material sufficiently and evenly. The sufficiency of hard granular material provides the protective layer with hardness and strength, which ensures the protective layer's excellent wear resistance, hardness, strength, and cleanability.

Specifically, the mass ratio of hard granular material and silicon-containing cladding material is 1:1-1:3. For example, the mass ratio of hard granular material and silicon-containing cladding material is 1:1-1:2 and 1:2-1:3, etc. For example, the mass ratio of hard granular material and silicon-containing cladding material is 1:1, 1:1.5, 1:2, 1:2.5 and 1:3, etc.

The hard granular material is one or more selected from the group consisting of metallic material, ceramic material, carbon particle, and silicon metal. The hardness and strength of hard granular material have significant effect on the prepared protective layer's hardness, wear resistance and strength. The application of hard granular material with high hardness and strength provides the protective layer with excellent wear resistance and strength. The foregoing hard granular material has excellent hardness, resistance, and corrosion resistance. Hence, the protective layer prepared from the composite material has excellent hardness, wear resistance and corrosion resistance, performing functions durably.

Specifically, the metallic material is one or more selected from the group consisting of titanium, nickel, chromium, silver, copper, iron, molybdenum, titanium alloy, aluminum alloy, stainless steel, Ni—Cr alloy, Ni—Cu alloy, co-CR—W alloy, Ni—CR—Al—Y alloy, co-CR—Al—Y alloy, and Fe—CR—Al—Y alloy; the ceramic material is one or more selected from silicon carbide, silicon oxide, hexagonal boron nitride, yttrium oxide, zirconium oxide, and titanium oxide; the carbon granular is one or more selected from graphite particle, graphene particle and carbon fiber particles. The hard granular material has excellent hardness, wear resistance and corrosion resistance, as well as non-toxicity. Hence, the protective layer made of the composite material has excellent hardness, wear resistance and corrosion resistance, performing functions with safety and non-toxicity durably.

The particle size of hard granular material is 300-600 mesh. The size range of hard granular material has an effect on the protective layer's function and processing technology. The particle size of hard granular material in excessive smallness leads to difficulties in granular material' dispersion, and the hard granular material tends to conglomerate in the process of being mixed to prepare composite material, resulting in hard granular material clad in silicon-containing cladding material insufficiently, which will degrade the performance of the protective layer and cause problems of stuck powder tubes in the preparation process of the protective layer. The particle size of hard granular material in excessive largeness leads to a relatively large granular interspace in the protective layer, resulting in relatively large porosity, which will affect the protective layer's properties, such as strength and cleanability. The particle size of hard granular material in excessive largeness will lead to an insufficient hot-melting of the surface of the granule in the preparation process also, which will degrade the product quality. The application of hard granular material in the foregoing particle size range ensures the silicon-containing cladding material and hard granular material are mixed uniformly, enables the silicon-containing cladding material to adhere to the surface of the hard granule uniformly, and is conducive to the following process of granulation. At the same time, the application of such a particle size range of hard granule material ensures the hard granule material disperses in the protective layer evenly and reduces the porosity of the protective layer, which gives the protective layer excellent wear resistance and durable cleanability.

Specifically, the particle size of the hard granular material is 300-600 mesh. For example, the particle size of the hard granular material is 300-500 mesh, 300-400 mesh, 400-600 mesh, 400-500 mesh and 500-600 mesh, etc. For example, the particle size of the hard granular material is 300 mesh, 325 mesh, 400 mesh, 500 mesh and 600 mesh, etc.

Specifically, the metallic material is one or more selected from the group consisting of titanium, nickel, chromium, silver, copper, iron, molybdenum, titanium alloy, steel, aluminum alloy, Ni—Cr alloy, Ni—Cu alloy, co-CR—W alloy, Ni—CR—Al—Y alloy, co-CR—Al—Y alloy, and Fe—CR—Al—Y alloy.

The composite material is powder cored wire or composite powder, wherein the powder cored wire has a powder core of hard granular material clad in the silicon-containing cladding material and outer shell of the metallic cladding material. The composite powder has a core-shell structure, which has a core of hard granular material clad in silicon-containing cladding material, then clad in metallic cladding material. The composite material can be made into the form of powder cored wire or composite powder, suitable for different processing technologies. The powder cored wire has strong applicability due to short preparation period and low production cost, while the composite powder has uniform granular performance clue to the even cladding of outer metal.

A preparation method for the composite material applied to cookware is provided, including the following steps: mixing the hard granular material evenly with the silicon-containing cladding material till the hard granular material clad in the silicon-containing cladding material uniformly; obtaining composite granule clad in the silicon-containing cladding material on the surface from a mixture of the hard granular material and the silicon-containing cladding material via a process of spraying-granulating or drying-grinding; dual cladding the composite granule clad in the silicon-containing cladding material on the surface in the metallic cladding material, obtaining the composite material applied to cookware. In the preparation process, the hard granular material is mixed with the silicon-containing cladding material mechanically, ensuring the surface of the hard granular material contacts the silicon-containing cladding material sufficiently and the hard granular material first clad in silicon-containing cladding material sufficiently; then obtaining the composite granule material via a process of spraying-granulating or drying-grinding, producing the composite material with a three-layer sandwich structure of "hard-soft-hard bases", which is prepared with dual cladding the core of composite granule material in the metallic cladding material. The prepared composite material has excellent stability due to the structure with even layers which are bonded together tightly and firmly.

The dual cladding method is selected from the powder-in-tube cladding, powder-in-shell cladding, vacuum plating and chemical plating. The dual cladding method, selected from the powder-in-tube cladding and the powder-in-shell cladding, wherein the metallic cladding material is shaped to a metal tube/a thin metal strip, and the composite granule clad in the silicon-containing cladding material is filled into the outer layer of the metal tube/thin metal strip, then the powder core wire in specific size is prepared via continual processes, such as rolling and stretching for reducing diameters. The foregoing method has strong applicability due to short preparation period and low production cost. Options for dual cladding processes for the preparation of composite powder are vacuum plating and chemical plating, wherein the surface of composite granule clad in silicon-containing cladding material is plated with metallic cladding material evenly, obtaining the granule with uniform performance.

A cookware is provided, which includes a substrate and a protective layer, wherein the substrate includes an inner cooking surface, and the protective layer is arranged at least on the inner cooking surface of the substrate, and the protective layer is prepared from the composite material. The structure of the protective layer includes a framework of hard granules, silicon-containing cladding material, and metal binding phase. After the metal binding phase in the surface layer is partially worn in use, the property of silicon-containing cladding material near the surface layer comes into play firstly, giving the cookware cleanability, then the silicon-containing cladding material inside the protective layer is gradually exposed to the surface layer with the consumption of the surface material in use, which ensures the protective layer durable cleanability. In addition, the silicon-containing cladding material exposed on the surface will decompose under the condition of a high temperature such as dry combustion, forming fine pores to retain oil, which is conducive to improving the cleanability of the cookware. At the same time, a structure with low surface energy and high hardness materials such as Si—C, Si—O, C, etc will be formed via thermal decompositions of silane, siloxane, silane polymer, and siloxane polymer. The foregoing material structure keeps the protective layer excellent cleanability, strength and wear resistance after the silicon-containing cladding material decomposed thermally, ensuring the cookware has excellent cleanability, strength, and wear resistance under the condition of high temperature such as dry combustion. The Vickers hardness of the protective layer is 750-1000 HV, and the surface of the protective layer has a hydrophobic angle of 110-150°, which is still greater than 100° after 10,000 times of treatment of a scouring pad, which indicates that the protective layer has durable wear resistance, corrosion resistance, and cleanability.

The protective layer is formed by thermal spraying or thermal cladding by processing composite material on the inner cooking surface of the substrate. Options for the processing heat source are an electrical arc, ion arc, and flame. When using the electrical are or ion arc as the heat source, the heat source voltage is 30-80V, and the current is 150-600 A. The metallic cladding material, as the outer layer of the said composite material, is heated to melt during the preparation of the protective layer, and bonds to the surface of the cookware firmly, while the hard granule clad in silicon-containing cladding material is linked together firmly, which gives the prepared protective layer excellent strength, wear resistance, and durable cleanability, as well as not easy to peel off.

The protective layer can be permeated and modified with low surface energy material further. Some pores will distribute on the surface of the protective layer due to the actual operation deviation and thermal decomposition of silicon-containing cladding material when the protective layer is prepared via thermal processes such as thermal spraying or thermal cladding. The surface free energy of the protective layer will be reduced further when the protective layer is permeated and modified with low surface energy material after being prepared via a thermal process and the cleanability of cookware will be improved. Options for the low surface energy material are fatty acid, silicone oil, and titanium silicon oxide, etc.

The composite material of the present disclosure, the method of preparing such material, and the cookware thereof will be fully described referring to the embodiments.

Embodiment 1

Raw material: the hard granular material, which is the composite granule formed via mixing the silicon oxide granule and the titanium oxide granule with a mass ratio of 1:1. The particle size of hard granular material is 400 mesh. The compositions of silicon-containing cladding material are dimethicone, ethanol, and isopropanol, wherein the mass proportion of dimethicone is 60%; the mass proportion of ethanol is 20%, and the mass proportion of isopropanol is 20%. The selection of outer cladding material is TC4 titanium alloy.

Preparation of the Composite Material:

The composite granule of silicon oxide/titanium oxide, and the silicon-containing cladding material are thoroughly mixed in the mixer according to the mass ratio of 1:2;

After mixing well thoroughly, the mixture is dried and granulated via spray granulation, obtaining the composite granule clad in dimethicone;

The prepared composite granule is filled into a thin strip of titanium alloy, obtaining the composite powder cored wire in a diameter of 2 mm via continuous processes of rolling and stretching for reducing diameters. A Schematic of the structure of composite powder cored wire is shown in FIG. 1, wherein the surface layer of the hard granule is clad in the silicon-containing cladding material with the main composition of dimethicone, and the outer part of the composite granule is fully clad in titanium alloy shells.

Preparation of the Cookware

Cleaning and roughening the inner surface of the cookware body: the inner surface of the cookware is done derusting, cleaned via ultrasound with alcohol applied, dried, then sanded and roughened;

Plasma spraying: the protective layer is prepared from a raw material of the prepared composite powder cored wire, by spraying the raw material onto the inner surface of the cookware body via the process of plasma spraying, after the cookware body has been cleaned and roughened, wherein heat source has a voltage of 50V and a current of 300 A;

Modifying the surface of the protective layer: the surface of the protective layer prepared with spraying is permeated and modified with titanium silicon oxide.

Figure 2:
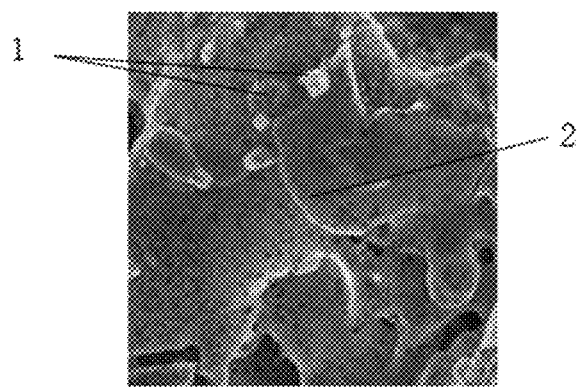
FIG. 2 illustrates a scanning electron microscope diagram of the protective layer of cookware prepared in Embodiment 1 of the present disclosure.

From the SEM diagram of the protective layer of the cookware in FIG. 2, it can be seen that the hard granule 1 clad in silicon-containing cladding material on the surface of the protective layer is dispersed in the metal binding phase 2 formed via the fusing of metallic cladding material, and all hard granule is linked into a whole by the metal binding phase 2.

The properties of the protective layer: the Vickers hardness of the protective layer is 900 HV, and the surface of the protective layer has a hydrophobic angle of 145°, which is 135° after 10,000 times of treatment of a scouring pad.

Embodiment 2

Raw material: the hard granule material, which is the Ni—Cr granule in particle size of 325 mesh. The compositions of silicon-containing cladding material are methyltriethoxysilane, glycerin, sodium stearate, and ethanol, wherein the mass proportion of methyltriethoxysilane is 50%; the mass proportion of sodium stearate is 10%; the mass proportion of glycerin is 20%, and the mass proportion of ethanol is 20%. The outer cladding material is metallic copper.

Figure 3:
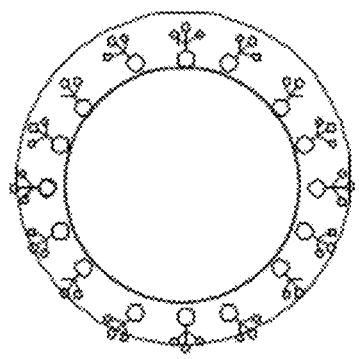
FIG. 3 Illustrates a structural diagram of the composite material in Embodiment 2 of the present disclosure.

Preparation of the Composite Material:

The Ni—Cr alloy granule and the silicon-containing cladding material are thoroughly mixed in the mixer according to the mass ratio of 1:3;

After mixing well thoroughly, the mixture is dried and granulated via spray granulation, obtaining the composite granule clad in methyltriethoxysilane;

The prepared composite granule is plated by a metallic copper cladding via the vacuum magnetron sputtering method. Schematic of the structure of composite powder is shown in FIG. 3, wherein the surface layer of hard granule is clad in silicon-containing cladding material with the main composition of methyltriethoxysilane, and the outer part of silicon-containing cladding material is fully clad in the metallic copper.

Preparation of the Cookware

Cleaning and roughening the inner surface of the cookware body: the inner surface of the cookware is done derusting, cleaned via ultrasound with alcohol applied, dried, then sanded and roughened;

Plasma spraying: the protective layer is prepared from raw material of the prepared composite powder cored wire, by spraying the raw material onto the inner surface of the cookware body via the process of plasma spraying, after the cookware body has been cleaned and roughened, wherein heat source has a voltage of 30V and a current of 150 A;

The properties of the protective layer: the Vickers hardness of the protective layer is 1000 HiV, and the surface of the protective layer has a hydrophobic angle of 135°, which is 120° after 10,000 times of treatment of a scouring pad.

It is to be understood that the foregoing embodiments of the present disclosure are shown and described, which is exemplary though is not intended to limit the present disclosure. Many changes, modifications, alternatives, and variations will be covered in the scope of the present disclosure by those skilled in the art.

What is claimed is:

1. A composite material applied to cookware, comprising:
hard granular material;
silicon-containing cladding material; and
metallic cladding material,
wherein said hard granular material is clad in said silicon-containing cladding material;
the silicon-containing cladding material is clad in said metallic cladding material; and
wherein said silicon-containing cladding material comprises a main composition comprising at least one selected from the group consisting of silane, siloxane, silane polymer, and siloxane polymer, and
wherein said composite material is a powder cored wire, said powder cored wire comprising a powder core made of the hard granular material clad in said silicon-containing cladding material and an outer shell made of said metallic cladding material; or wherein said composite material is composite powder, said composite powder comprising a core-shell structure, the core-shell structure comprising a core made of the hard granular material clad in said silicon-containing cladding material and subsequently said metallic cladding material.

2. The composite material of claim 1, wherein:
said siloxane polymer comprises at least one selected from the group consisting of methyl silicone oil and dimethicone; and
said silane comprises at least one selected from the group consisting of tetraethoxy silane and methyltriethoxysilane.

3. The composite material of claim 1, wherein:
said main composition has a mass proportion of 20-80% in said silicon-containing cladding material.

4. The composite material of claim 1, wherein:
said hard granular material and said silicon-containing cladding material have a mass ratio of 1:1-1:3.

5. The composite material of claim 1, wherein:
said hard granular material comprises at least one selected from the group consisting of metallic material, ceramic material, carbon particle, and silicon metal.

6. The composite material of claim 5, wherein:
said metallic material comprises at least one selected from the group consisting of titanium, nickel, chromium, silver, copper, iron, molybdenum, titanium alloy, aluminum alloy, stainless steel, Ni—Cr alloy, Ni—Cu alloy, co-CR—W alloy, Ni—CR—Al—Y alloy, co-CR—Al—Y alloy, and Fe—CR—Al—Y alloy; and
said ceramic material comprises at least one selected from silicon carbide, silicon oxide, hexagonal boron nitride, yttrium oxide, zirconium oxide, and titanium oxide; and
said carbon particle comprises at least one selected from graphite particle, graphene particle and carbon fiber particle.

7. The composite material of claim 1, wherein:
said hard granular material has a particle size of 300-600 mesh.

8. A process of preparing the composite material of claim 1, comprising:
mixing the hard granular material evenly with the silicon-containing cladding material till the hard granular material clad in the silicon-containing cladding material uniformly;
obtaining composite granule clad in the silicon-containing cladding material on the surface from a mixture of the hard granular material and the silicon-containing cladding material by spraying-granulating or drying-grinding;

dual cladding the composite granule clad in the silicon-containing cladding material on the surface in the metallic cladding material, obtaining said composite material applied to cookware.

9. The process of claim 8, wherein:
the dual cladding method is one of the methods selected from powder-in-tube cladding, powder-in-shell cladding, vacuum plating, and chemical plating.

10. A cookware comprising a substrate and a protective layer, wherein:
said substrate comprises an inner cooking surface;
said protective layer is arranged at least on the inner cooking surface of said substrate; and
wherein said protective layer is prepared from the composite material of claim 1.

11. The cookware of claim 10, wherein:
said protective layer is formed by: thermal spraying or thermal cladding said composite material on the inner cooking surface of the substrate.

12. The cookware of claim 11, wherein:
said protective layer is further permeated and modified with low surface energy material.

\* \* \* \* \*